United States Patent [19]

McGuire

[11] Patent Number: 4,752,683
[45] Date of Patent: Jun. 21, 1988

[54] ROTARY ENCODER HAVING FLEXIBLE COUPLING MEANS

[75] Inventor: Douglas R. McGuire, Goleta, Calif.

[73] Assignee: BEI Electronics, Inc., San Francisco, Calif.

[21] Appl. No.: 8,838

[22] Filed: May 15, 1987

Related U.S. Application Data

[63] Continuation of Ser. No. 839,771, Mar. 14, 1986, abandoned, which is a continuation of Ser. No. 437,506, Oct. 28, 1982, abandoned.

[51] Int. Cl.$^4$ .............................................. G01D 5/34
[52] U.S. Cl. .................................. 250/231 SE; 464/60
[58] Field of Search ............ 250/231 SE, 237 G, 239; 356/395; 340/347 P; 464/60

[56] References Cited

U.S. PATENT DOCUMENTS

| | | | |
|---|---|---|---|
| 2,567,663 | 9/1951 | Deubel | 464/60 |
| 3,000,198 | 9/1961 | Stout | 464/60 |
| 3,068,666 | 12/1962 | Sabadash | 464/60 |
| 3,328,591 | 6/1967 | Jones | 250/231 SE |
| 3,934,428 | 1/1976 | Hedin | 464/60 |
| 4,326,128 | 4/1982 | Klein | 250/237 G |
| 4,385,234 | 5/1983 | Johnson | 250/231 SE |

OTHER PUBLICATIONS

1979, Heli-Cal, One Piece Rotating Shaft Flexible Couplings, 22 pages.

Primary Examiner—David C. Nelms
Assistant Examiner—William L. Oen
Attorney, Agent, or Firm—Limbach, Limbach & Sutton

[57] ABSTRACT

A low height-profile rotary optical encoder having an improved coupling structure for coupling the code disc to the shaft for which positional information is desired wherein the coupling structure includes a coupling member having a shaft portion and an integral flexible coupling portion, a bearing structure for rotatably supporting the shaft portion within the encoder, the bearing structure and shaft portion each having a length which is substantially equal to one another, and the height of the encoder optics can be greater than the height of the bearing structure, and a base which is adapted to support the bearing structure, the shaft portion of the coupling member and the encoder optics in a common transverse section of the encoder and to house the flexible coupling portion of the coupling member wholly within the base.

6 Claims, 3 Drawing Sheets

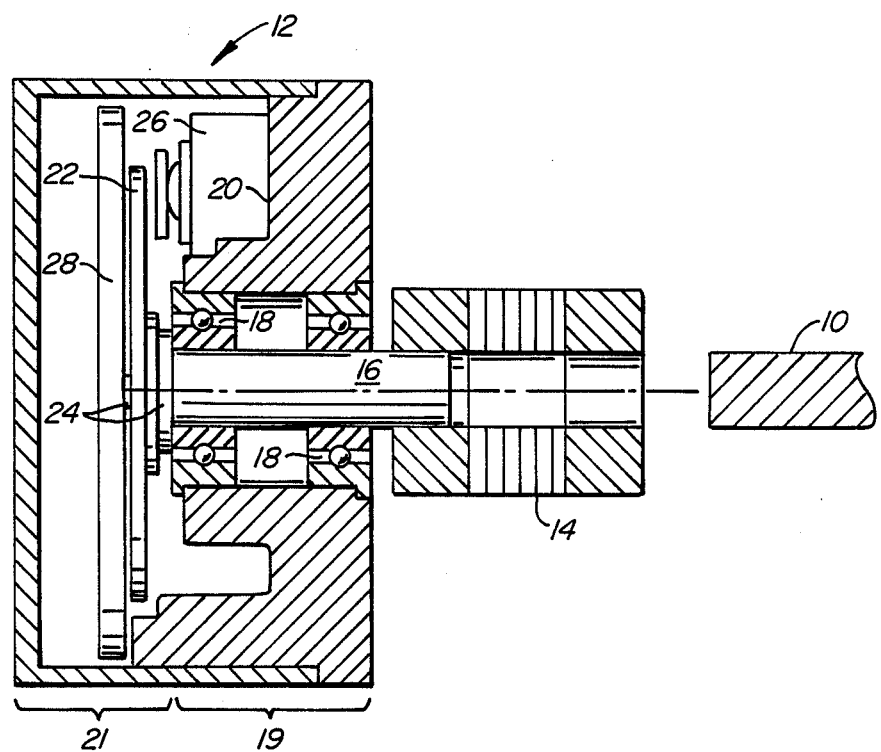
FIG.—1.
PRIOR ART
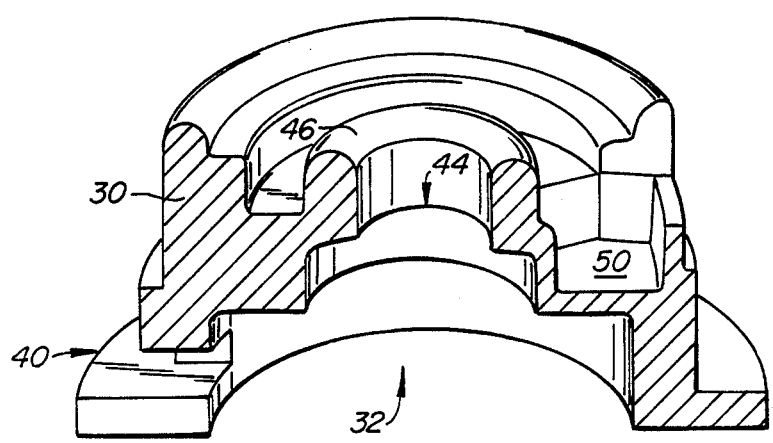
FIG.—4.

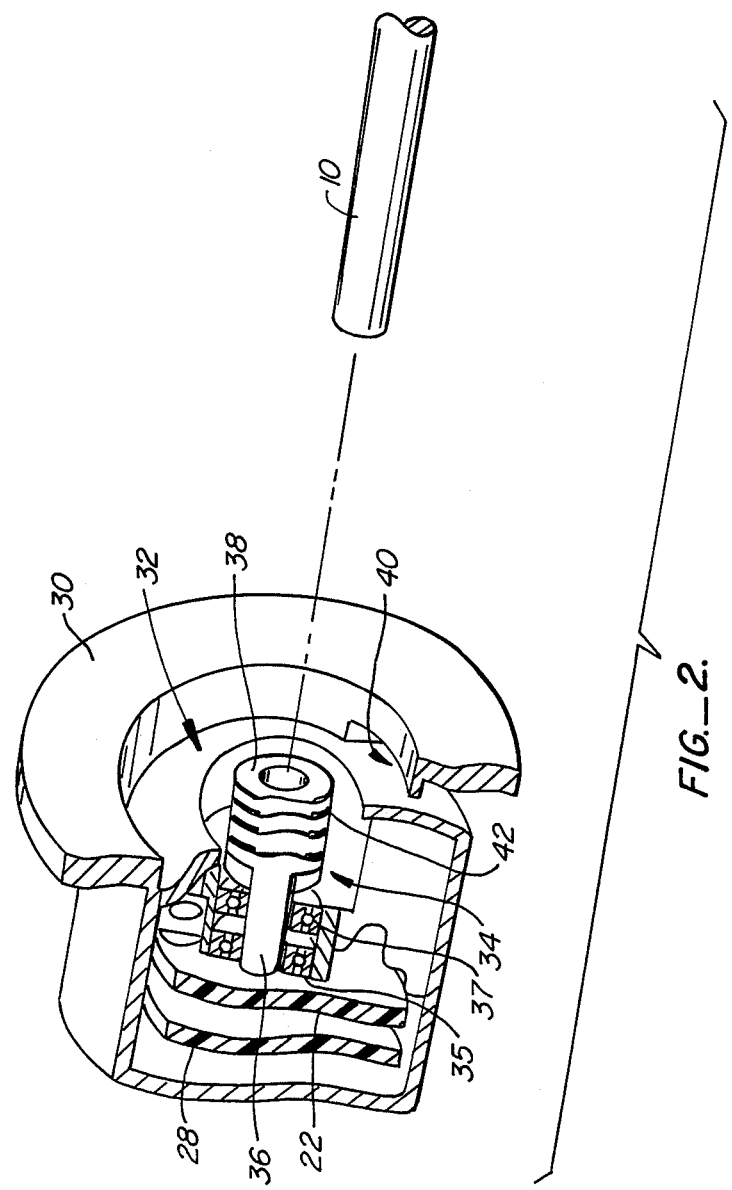
FIG._2.

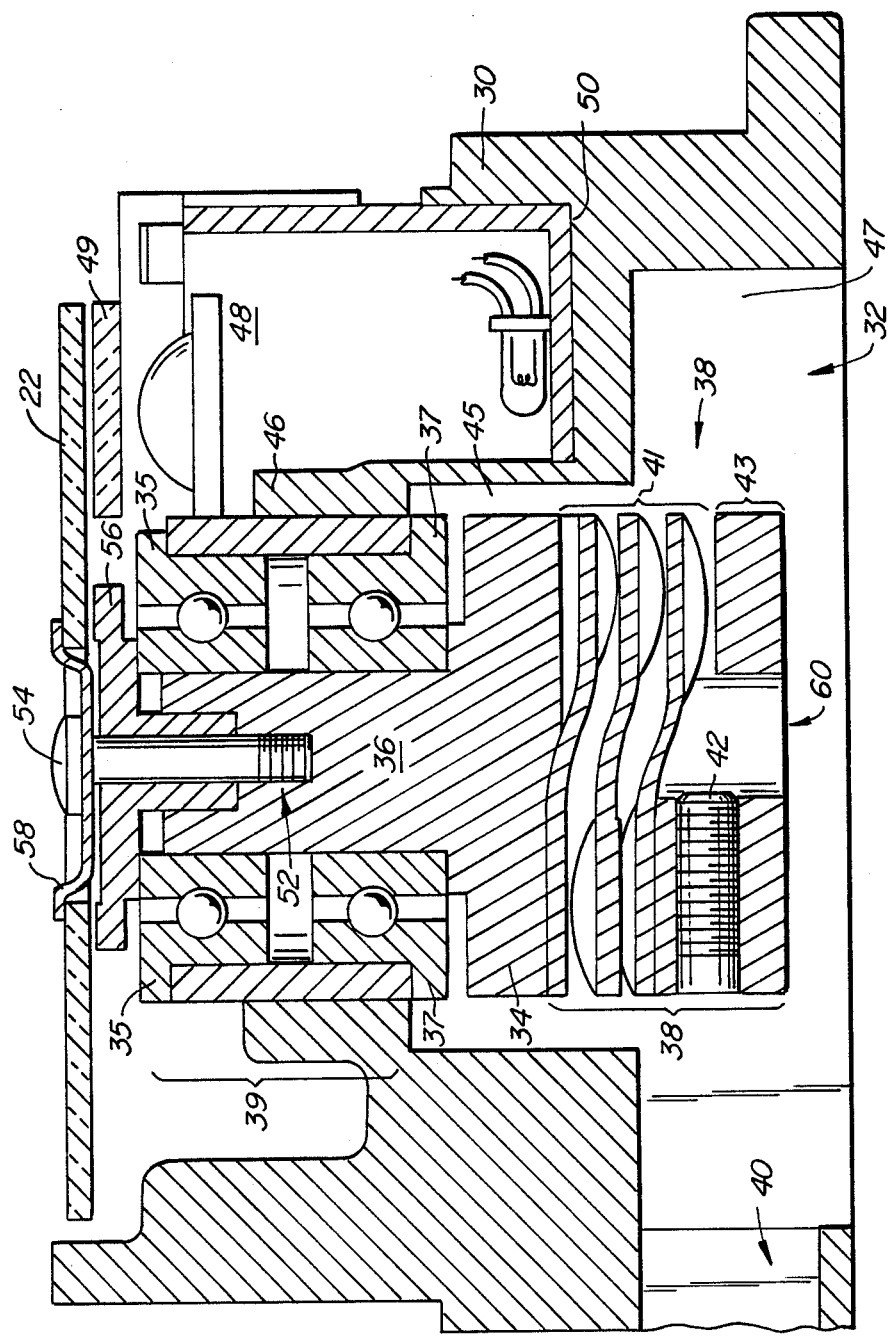
FIG._3.

ROTARY ENCODER HAVING FLEXIBLE COUPLING MEANS

This is a continuation application Ser. No. 839,771 filed Mar. 14, 1986 now abandoned which is a continuation of Ser. No. 437,506 filed 10-28-82 now abandoned.

TECHNICAL FIELD

The present invention relates generally to rotary encoders and more specifically to a rotary encoder having an improved structure for coupling the code disc of the encoder to the shaft for which rotational data are desired.

BACKGROUND ART

Rotary encoders, especially optical rotary encoders, have found widespread use in the industry for determining the rotational position of motor shafts, gearing, axles and the like, hereinafter collectively referred to as "object shaft."

In the typical optical encoder, a transparent disc is rotated by the object shaft for which position information is desired. The code disc includes a large number of radially-positioned indicia which are coded to indicate the particular radial position of each indicia on the code disc. A light or illumination source is provided on one side of the code disc to project a beam of light through the disc and onto a photo detector. As the code disc is rotated by the object shaft, the indicia on the disc modify the light beam as the indicia pass therethrough, thereby providing a unique light pattern to the photo detector which can decode the pattern to indicate the position of the disc. This information is then processed and provided to the user by other circuitry within the encoder.

The code disc is coupled to the object shaft by a coupling member. Typically, this coupling member takes the form of a shaft which is supported for rotation within the encoder and which is brought outside of the encoder housing for attachment to the object shaft.

This is called the "protruding shaft" style of rotary encoder. The other commonly available rotary encoder is called the "kit" style. With the "kit" style, the object shaft is used as an integral part of the encoder. The object shaft is inserted through the encoder and the code disc and is then coupled to the code disc via a flexible coupling.

With respect to the "kit" encoders, problems associated with such arrangements include shaft end play, which makes precise alignment of the code disc and the optics difficult. Also a problem is the requirement that the user handle and adjust key optical and electronic components. Since, in the "kit" style, the object shaft becomes an integral part of the encoder, the user necessarily must have access to the interior of the encoder, thereby exposing delicate portions of the encoder to potential damage. Additionally, "kit" encoders have used a single bearing to support the shaft of interest, thereby permitting excessive shaft movement and hence further misalignment of the code disc and the optics.

With respect to the "protruding shaft" configuration, the inherent disadvantage is its high profile. The shaft which protrudes from the encoder must extend a sufficient distance from the bottom of the encoder to permit a flexible coupling to be mounted thereto. Typically, this distance should be as great as the diameter of the shaft. The other end of the flexible coupling is then connected to the object shaft. Thus, the length of the encoder is extended beyond the encoder housing by at least the length of the flexible coupling used. This additional length is often intolerable, especially in situations in which space is at a premium. Additionally, the protruding shaft represents a long moment arm with respect to the structures which support the shaft within the encoder itself, thus the amount of force which the user can exert upon the shaft, and, hence, upon the bearings and other support structures within the encoder, can vary over a wide range. This potential variation requires that at least two bearing structures be utilized within the encoder and that these bearing structures have a substantial spacing between one another to provide the desired "stiffness" to the shaft. This spacing between the bearings also adds to the height profile of the encoder.

SUMMARY OF THE INVENTION

The foregoing and other problems of rotary encoders are overcome by the present invention of an improved rotary encoder, for indicating the position of an object shaft, of the type in which a code disc is rotated with respect to illumination optics, the code disc being rotated by the object shaft, the improvement comprising a base having a first face and a second opposite face, a coupling chamber which opens to the first face, an aperture which is coaxial with the coupling chamber and which connects the coupling chamber to the second face, and a lip which is positioned about the aperture and which extends outwardly from the second face. The code disc is positioned above the aperture and lip, and the illumination means are positioned between the code disc, upon the second face and in radial alignment with the lip of the second face. Coupling member means are provided for coupling the object shaft to the code disc. The coupling member means have a shaft portion and a flexible coupling portion which are located along a common axis. The two portions are of substantially equal length. The free end of the shaft portion is adapted for connection to the code disc, while the flexible coupling portion is adapted to receive the object shaft. The flexible coupling portion permits the coupling member means to transmit the rotational motion of the object shaft despite misalignment of the object shaft with the axis of rotation of the code disc. Bearing means are positioned within the aperture and the lip of the base for rotatably supporting the shaft portion of the coupling member means, wherein the shaft portion is positioned substantially within the bearing means so that the bearing means, the illumination optics, and the shaft portion of the coupling member means are all substantially radially aligned with one another. As result of such positioning, the flexible coupling portion of the coupling member means is positioned substantially within the coupling chamber of the base.

As a result of such a configuration, the overall length of the rotary encoder can be substantially shortened. Provision of coupling member means having a shaft portion and an integral flexible coupling portion permits the overall length of the coupling member means to be substantially shortened. With the flexible coupling portion being included as an integral part of the coupling member means, there is no need for the user of the encoder to access to the encoder end of the flexible coupling. Thus, the flexible coupling portion can be positioned wholly within the encoder body. The above shortening of the overall length of the coupling member means effectively limits the mechanical forces that the user can exert on the bearing structure within the encoder which supports the shaft portion of the coupling member means. As such, the forces which must be sustained by the bearing structure become predictable and, as such, it has been found that the bearing structure can be shortened substantially. With such a shortened bearing structure, the overall length of the coupling member means can be further reduced. With the protruding shaft encoder design, the height of the illumination optics is limited by the thickness of the base of the encoder. An increase in height of the illumination optics beyond that thickness would require the base thickness, and hence the overall height of the encoder, to increase. Since the discrete flexible coupling is external to the base, and since its height contribution is constant, an increase in the base thickness relates directly to an increase in encoder height. With the improved design of the present invention, the shaft portion of the coupling member means is positioned within substantially the same transverse section of the encoder as is the illumination optics and the illumination optics can even overlap the flexible coupling portion thereof. Because of this overlap, a larger increase in illumination optics height can be implemented before the overall height of the encoder is affected.

As a result, the overall length of the encoder can be reduced or the illumination optics can be lengthened without an increase in the overall encoder height. The flexible coupling portion to which the user connects the object shaft can now be contained wholly within the encoder housing while still maintaining bearing stiffness.

It is therefore an object of the present invention to provide a rotary encoder in which the coupling means by which the user couples the object shaft to the encoder is contained wholly within the encoder body.

It is another object of the present invention to provide a rotary encoder in which a code disc is coupled to an object shaft by way of a coupling member, the coupling member having a shaft portion adapted for connection to the code disc and an integral flexible coupling portion which is adapted for connection to the object shaft, wherein the shaft portion and flexible coupling portion are of substantially equal length and furtherwherein the shaft portion is supported for rotation by and substantially positioned within the bearing means, the bearing means being positioned on a base in substantial radial alignment with the illumination optics of the encoder.

It is still another object of the present invention to provide a rotary encoder having a base which has a coupling chamber extending inwardly from a first face and a aperture and lip structure on a second opposite face, and wherein coupling member means are supported by bearing means which are positioned in the aperture and lip portion so that the coupling member means are contained substantially wholly within the base of the encoder.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a cut-away view along the axis of rotation of a "protruding shaft" prior art rotary encoder.

FIG. 2 is a plan, cut-away view of a rotary encoder constructed according to the teaching of the present invention.

FIG. 3 is a cut-away view taken along the axis of rotation of the code disc.

FIG. 4 is a plan, cut-away view of the base portion of the present invention.

DETAILED DESCRIPTION OF THE DRAWINGS

Referring to FIG. 1, a traditional protruding shaft encoder design is shown. The object shaft 10 is coupled to the rotary encoder 12 by way of a separate flexible coupling 14. The other end of flexible coupling 14 is connected to the protruding shaft 16 of the encoder 12. The purpose of flexible coupling 14 is to permit the transfer of rotational motion from rotating shaft 10 to protruding shaft 16 despite any misalignment between the two shafts. One such flexible coupling is formed by developing a helical groove around the outer diameter of a cylindrical structure so that the remaining webs resemble the cross-section of a type of edge wound spring that cannot be wound. Such a structure is described in U.S. Pat. No. 3,068,666, and is commercially available from Helical Products Company, Inc. of Santa Maria, Calif.

Protruding shaft 16 is supported within encoder 12 by bearings 18. Due to the length of protruding shaft 16, a significant spacing between the bearings 18 is required to provide sufficient "stiffness" to accommodate any user-induced forces on protruding shaft 16. Because the shaft has a significant length, these user forces can be very large. In FIG. 1 this spacing is shown to be approximately twice the height of one bearing 18. Additionally, the force-handling capabilities of bearings 18 themselves must be sufficiently high to accommodate such forces. Bearings 18 are supported by base 20. Protruding shaft 16 is coupled to code disc 22 by a hub and screw fixture 24. Disposed upon base 20 and beneath one section of code disc 22 is an optics assembly 26. Disposed on the side of the code disc opposite the optics assembly are optical detector circuits and processing circuitry 28.

In order to facilitate the connection of flexible coupling 14 to protruding shaft 16, the protruding shaft 16 is required to extend from the encoder 12 for a distance which is typically greater than one-fourth inch. Similarly, flexible coupling 14 is typically at least one-half inch in length to accommodate one-fourth inch each of the protruding shaft 16 and the object shaft 10. In practice, the length of shaft engagement by the flexible coupling should be as least as great as one shaft diameter. Thus, the one-fourth inch engagement lengths recited herein correspond to shaft diameters of approximately one-fourth inch. In addition, substantial length is added by the spacing required for the helical grooves in the flexible coupling 14. Thus, it can be seen that the overall profile of the protruding shaft encoder 12, when coupled to the object shaft 10, is increased by a substantial amount due to the protruding shaft and flexible coupling dimensions.

Referring to FIG. 2, a rotary encoder constructed according to the present invention is shown in plan view. A base 30 is provided which has a coupling chamber 32. A coupling member 34 is disposed wholly within the encoder base 30.

The coupling member 34 includes a shaft portion 36 which is adapted for connection to code disc 22, and an integral flexible coupling portion 36 which is adapted for connection to the rotating shaft of interest 10. The length of coupling member 34 and the spacing of bearings 35 and 37 are selected so that the flexible coupling portion 36 is located well within coupling chamber 32 of base 30. The flexible coupling portion 36 is an integral part of coupling member 34 so that no access is required by the user to the end of the flexible coupling portion 48 which connects to the shaft portion 36. Typically, the length of the flexible coupling portion 38 is substantially equal to the length of the shaft portion 36.

In order to connect the encoder of the present invention to the object shaft 10, the object shaft 10 is inserted into the flexible coupling portion 36. By way of a slot 40 which is cut into base 30, the user can gain access to screws 42 which are disposed in the side of the flexible coupling 38. Tightening of these screws 42 permit flexible coupling 38 to grip rotating shaft 10 tightly. No further user adjustment to the encoder is required.

Referring to FIG. 3, the arrangement of the coupling member 34, the base 30 and bearings 35 and 37 will now be described in greater detail. As can be seen from FIG. 3, base 30 has a coupling chamber 32 within which the flexible portion 38 of coupling member 34 is positioned. Coupling chamber 32 is approximately coaxial with an aperture 44 and lip structure 46 disposed on the opposite face of base 30. Aperture 44 and lip structure 46 form a bearing housing. Lip structure 46 is positioned about the periphery of aperture 44. See FIG. 4.

In FIG. 3, optics assembly 48 can be seen positioned adjacent lip structure 46 and upon face 50 of base 30 and so that it substantially overlaps coupling member 34. Because the flexible coupling portion 38 of coupling member 34 is now contained wholly within base 30, the region occupied by the optics assembly 48 can now overlap a substantial portion of the flexible coupling portion 38 and thereby avoid increasing the height of the encoder. In practice, the height of the optics assembly 48 can range in size from that shown in FIG. 3 to a height which is less than the height of bearing structure 49. The optics assembly 48 could even be extended to the bottom of base 30, assuming that chamber portion 47 were not required for clearance of structures associated with object shaft 10. The structure of the present invention thus permits one to obtain the improved optical properties including improved collimation, associated with longer optics assemblies without an increase in encoder height. Thus, optics assembly 48 can be said to be capable of substantially radial alignment with coupling member 34. In other words, the lip and aperture structures of base 30 are formed to support a bearing structure 39 and shaft portion 36 having a minimized vertical height, and so that an optics assembly can extend from the bottom of base 30 all the way to mask 49. From another point of view, the lip and aperture structure of base 30, the optical assembly 48, and a portion of the flexible coupling 38 lie in a common transverse region of the encoder.

The bearings 35 and 37 are positioned within the aperture 44 and lip structure 46 to form a bearing structure 39. In FIG. 3, it can be seen that there is a minimum of spacing between the bearing 35 which is adjacent code disc 22 and the bearing 37 which is adjacent the flexible coupling portion 38. This minimum of spacing is permitted because the flexible portion 38 is now an integral part of coupling member 34 and, therefore a known element, and a prediction of the maximum possible user-induced load on the bearings is now permitted. As such, the total vertical dimension required for the bearings structure 39 can be made small.

The shaft portion 36 is shown in FIG. 3 as having a length approximately equal to the height of the bearing structure 39 and supported for rotation thereby such that the shaft portion 36 is contained substantially wholly within the bearing structure 39. In practice, the amount of reduction in shaft length and of the bearing height is limited by the height of two ball bearings.

In order to maintain precise and repeatable position indications, it is necessary that the code disc be maintained at a constant distance from the optics assembly 48. It is therefore important that the manner in which the code disc 22 is coupled to the object shaft 10 does not cause the alignment of the code disc 22 with respect to the mask 49, which is a part of the optics assembly 48 to change. Thus, the stiffness of the bearing structure plays a significant role in the precision of the optical encoder.

Shaft portion 36 includes a bore 52 which is shaped to accept a screw 54 and a hub 56. In turn, the screw and hub serve to secure code disc 22 to the shaft portion 36. As can be seen from FIG. 3, hub 56 has a "T" shape such that the leg portion thereof is positioned in the bore 52 of the shaft portion 36. The arms of hub 56 support code disc 22 on their upper surface and are, in turn, supported by the rotating portion of bearing 35 on their lower surface. The leg portion of hub 56 is hollow to permit screw 54 to pass therethrough and into the bore 52 of shaft portion 36. A preloading washer 58 is positioned between the head of screw 54 and the top of code disc 22. When screw 54 is screwed into the shaft portion 36, preloading washer 58 is compressed to thereby compress the code disc against hub 56.

Thus, screw 54 and preload washer 58 act to secure code disc 22 against hub 56. Hub 56, in turn, is supported for rotation by bearing 35. Preferably, both hub 56 and screw 54 are further secured within bore 52 of shaft portion 36 with an epoxy-like adhesive. Shaft portion 36 is supported for rotation by bearing structure 39 and likewise preferably bonded thereto with an epoxy-like adhesive.

As can be seen from FIG. 3, the length of the flexible coupling portion 38 and the length of the shaft portion 36 of coupling member 34 are approximately equal. Also note that shaft portion 36 is positioned substantially within the bearing structure 39 formed by bearings 35 and 37. Only the flexible coupling portion 38 protrudes into coupling chamber 32. In turn, because the flexible coupling portion 38 is an integral part of the coupling member 34, its length is determined by the flexure portion 41 and the portion 43 which engages with the object shaft 10. From a comparison of the prior art protruding shaft encoder of FIG. 1 and the encoder of FIG. 3, which is constructed in accordance with the present invention, it can be seen that the coupling chamber 32 extends into an area of base 30 which corresponds to that portion of the base 20 which is occupied by bearing 18 in FIG. 1. Thus, the overall height contributed to the encoder by the coupling member 34 is minimized by the structure of the present invention.

Coupling chamber 32 is shown to have two sections of differing diameter, with the section 45 which is closer to bearing structure 39 having a smaller diameter than the section 47 at the bottom of base 30. While it is not required that the two sections differ in diameter, the diameter of section 47 is preferably selected so that structures associated with the object shaft 10, such as a motor housing, or the like, can be accomodated within section 47 of coupling chamber 32. The diameter of section 45 is preferrable selected to accomodate the amount of flexture which can be expected from the flexible coupling portion 38.

While flexible coupling portion 38 has been discussed in terms of a helical-groove structure, it is to be understood that any other form of flexible coupling can be utilized to form the flexible coupling portion 38. For example, bellows type flexible couplings or couplings having a belville washer structure are suitable for the flexible coupling structure 38.

From FIG. 3, it can be seen that flexible coupling portion 38 contains a bore 60 which is shaped to receive the end of the object shaft 10. Set screw 42 is provided to secure the shaft to the coupling portion 38. Access slot 40 is provided in base 30 to permit user access to set screw 42.

By arrangement of and selection of the dimensions of the above discussed elements, a rotary encoder having a significantly reduced height profile can be obtained, while still retaining the desired alignment of the code disc to the optics assembly 48, and still accomodating similar amounts of parallel offset, angular offset, and axial play in the object shaft 10 which the prior art protruding shaft encoders are capable of handling.

By way of comparison, the height contribution attributable to the structures required to couple the code disc 22 to the object shaft 10 has been reduced by approximately ½ inch in encoders constructed according to the present invention, and as opposed to the typical protruding shaft encoders. For example, in the L-25 series of encoders manufactured by the assignee of this application, the protruding shaft version thereof has a protruding shaft which is typically connected to the object shaft 10 by a one inch long discrete flexible coupling. In contrast, with the structure of the present invention, the coupling member 34 is contained wholly within base 30 wherein base 30 is only approximately ¼ inch longer than the base for the L-25 series of encoder. In the L-25 series of encoders, the height of the bearing assembly 19 is approximately 0.90 inch long. The height of the disc and electronics area 21 is approximately 0.60 inch long for a total length overall of 1.5 inches, not including the coupling 14. When a one-inch flexible coupling is added to the protruding shaft, the overall length of this coupling structure becomes approximately 2½ inches.

With respect to the coupling member 34 constructed according to the present invention, the corresponding bearing portion 39 would be approximately one-half inch long, while the flexible coupling portion 38 would be approximately seven-tenths of an inch long and the electronics portion would be approximately 0.6 inches for a total of approximately 1.8 inches. Thus there is an approximate 0.7 inch length reduction between the coupling structures of the prior art protruding shaft encoder and the present invention.

Continuing with this comparative example, the bearing structure 39 which would accommodate the coupling member 34 having dimensions as set forth above, would require less than a tenth of an inch spacing between bearing 35 and bearing 37. Still, the resulting coupling structure would be capable of accommodating a parallel offset of 0.010 inch, an angular offset of 5 degrees, and axial play of 0.03 inches. The corresponding flexible coupling portion 38 of this example would have a length of approximately seven-tenths of an inch, of which approximately three-tenths thereof corresponds to flexture area. The diameter of such a coupling would be approximately one inch.

Bearing structure 39 can be any structure suitable for supporting and locating the shaft portion 36 with respect to the lip 46 and aperture 44 of base 30. Among these bearing structures are the rotary types such as bushings or rolling contact bearings having rolling elements interposed between an inner and outer ring. These rolling elements include ball, roller, or tapered roller structures. The bushings can be constructed of any anti-friction material.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

I claim:

1. An improved rotary encoder and coupling combination for releasable connection to a rotating object shaft, said combination comprising
   a base having spaced, oppositely directed first and second end surfaces and a passage extending therethrough between said surfaces to provide a bearing housing and a coupling chamber within the base which are contiguous and coaxial, with the bearing housing opening to the first surface and the coupling chamber opening to the second surface;
   an encoder shaft positioned within said bearing housing said encoder shaft carrying an optical code disc for rotation in relation to said first surface;
   bearing means mounted within said bearing housing for rotatably and stiffly supporting the encoder shaft therein relative to the base; and
   flexible coupling means secured to said encoder shaft for releasably securing the rotation object shaft substantially entirely within the coupling chamber, wherein the flexible coupling means has an expected amount of flexure and the coupling chamber has a diameter which is selected to accommodate the expected amount of flexure of the flexible coupling means.

2. The combination according to claim 1, wherein the object shaft includes operatively associated additional structure, and further wherein the coupling chamber is enlarged at the end thereof opening through the second surface to provide space around the flexible coupling means into which the operatively associated additional structure object shaft may extend.

3. The combination according to claim 1, wherein the bearing means engage the encoder shaft over the majority of the axial length of the encoder shaft.

4. The combination according to claim 1 wherein, the base is an integral unitary structure.

5. The combination according to claim 4 wherein the bearing means include first and second bearing structures each having a predetermined height, wherein the first and second bearing structures are positioned in and coaxially with the bearing housing, and are spaced apart form one another by a distance less than the height of either of the first or second bearing structures.

6. The combination according to claim 5 wherein the bearing means engage the encoder shaft over a predetermined amount of the axial length of the encoder shaft and further wherein the flexible coupling means has a length which is greater than said predetermined amount.

* * * * *